(12) United States Patent
Kudo et al.

(10) Patent No.: US 12,184,861 B2
(45) Date of Patent: Dec. 31, 2024

(54) ENCODING APPARATUS, ENCODING METHOD, AND PROGRAM

(71) Applicant: NIPPON TELEGRAPH AND TELEPHONE CORPORATION, Tokyo (JP)

(72) Inventors: Shinobu Kudo, Musashino (JP); Shota Orihashi, Musashino (JP); Ryuichi Tanida, Musashino (JP); Atsushi Shimizu, Musashino (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 424 days.

(21) Appl. No.: 17/595,049

(22) PCT Filed: May 10, 2019

(86) PCT No.: PCT/JP2019/018741
§ 371 (c)(1),
(2) Date: Nov. 8, 2021

(87) PCT Pub. No.: WO2020/230188
PCT Pub. Date: Nov. 19, 2020

(65) Prior Publication Data
US 2022/0224907 A1 Jul. 14, 2022

(51) Int. Cl.
*G06T 9/00* (2006.01)
*G06V 40/16* (2022.01)
(Continued)

(52) U.S. Cl.
CPC ........... *H04N 19/136* (2014.11); *G06T 9/002* (2013.01); *G06V 40/168* (2022.01); *H04N 19/124* (2014.11)

(58) Field of Classification Search
CPC .......... G06N 3/08; G06N 3/045; G06N 3/084; G06N 3/04; G06N 20/00; G06N 3/0455;
(Continued)

(56) References Cited

U.S. PATENT DOCUMENTS

| 2003/0118240 A1* | 6/2003 | Satoh | H04N 19/115 375/E7.14 |
| 2014/0185666 A1* | 7/2014 | Watanabe | H04N 19/33 375/240.02 |

(Continued)

FOREIGN PATENT DOCUMENTS

| JP | 2012019288 A | * | 1/2021 |
| WO | WO-2019093234 A1 | * | 5/2019 |

OTHER PUBLICATIONS

Johannes Ball'e et al., End-To-End Optimized Image Compression, Mar. 3, 2017.
(Continued)

*Primary Examiner* — Chan S Park
*Assistant Examiner* — Woo C Rhim
(74) *Attorney, Agent, or Firm* — Harness, Dickey & Pierce, P.L.C.

(57) ABSTRACT

An encoding device includes: an association processing unit that associates first encoded data which is encoded data of an original image with second encoded data which is encoded data of a decoded image which is a result of decoding of the encoded data of the original image; and an encoding unit that encodes, based on the result of associating the first encoded data with the second encoded data, a target image which is an image to be encoded.

8 Claims, 9 Drawing Sheets

(51) Int. Cl.
H04N 19/124 (2014.01)
H04N 19/136 (2014.01)

(58) Field of Classification Search
CPC ........ G06N 3/02; G06N 3/0464; G06T 9/002; G06T 3/4046; G06T 2207/20084; G06T 2207/20081; H04N 19/124; H04N 19/85; H04N 19/136; G06V 10/82; G06V 10/7715; G06V 40/168; G06F 18/213
See application file for complete search history.

(56) References Cited

U.S. PATENT DOCUMENTS

| | | | | |
|---|---|---|---|---|
| 2014/0247890 | A1* | 9/2014 | Yamaguchi | H04N 19/172 |
| | | | | 375/240.29 |
| 2015/0170004 | A1* | 6/2015 | Song | G06F 18/2113 |
| | | | | 382/218 |
| 2018/0007375 | A1* | 1/2018 | He | H04N 19/154 |
| 2018/0101957 | A1* | 4/2018 | Talathi | G06T 9/00 |
| 2020/0120340 | A1* | 4/2020 | Park | H04N 19/65 |
| 2020/0145661 | A1* | 5/2020 | Jeon | H04N 19/184 |
| 2020/0177470 | A1* | 6/2020 | Kuo | H04L 65/75 |
| 2020/0234469 | A1* | 7/2020 | Jeon | G06T 5/50 |
| 2020/0389658 | A1* | 12/2020 | Kim | H04N 19/184 |
| 2021/0044811 | A1* | 2/2021 | Hodgkinson | H04N 19/136 |
| 2021/0350586 | A1* | 11/2021 | Kim | H04N 19/102 |
| 2022/0046284 | A1* | 2/2022 | Nishi | H04N 19/192 |
| 2022/0138904 | A1* | 5/2022 | Kim | H04N 21/26258 |
| | | | | 382/232 |

OTHER PUBLICATIONS

Oren Rippel and Lubomir Bourdev, Real-Time Adaptive Image Compression, May 16, 2017.

* cited by examiner

Fig. 8

ENCODING APPARATUS, ENCODING METHOD, AND PROGRAM

CROSS-REFERENCE TO RELATED APPLICATIONS

This application is a 371 U.S. National Phase of International Application No. PCT/JP2019/018741 filed on May 10, 2019. The entire disclosures of the above applications are incorporated herein by reference.

TECHNICAL FIELD

The present invention relates to an encoding device, an encoding method, and a program.

BACKGROUND ART

An autoencoder includes an encoder and a decoder using machine learning such as a neural network (N.N.) or the like. The encoder may encode an unencoded image (original image). The decoder decodes encoded data to restore the original image. Each of the encoder and the decoder is formed of any given combination of operation units. When the original image is input to the autoencoder, the encoder is formed of a combination of convolution operation units, while the decoder is formed of a combination of inverse operation units of the encoder.

The autoencoder updates parameters of the neural network through learning processing using, e.g., backpropagation. In backpropagation, an error between an output of the autoencoder to which training data is input and teacher data (correct answer data) is derived based on an evaluation index designed in advance. In backpropagation, a gradient of the parameters of the neural network is derived based on the error in order from the output of the autoencoder to an input thereto. The parameters are updated by a predetermined optimization method based on the derived gradient.

When the original image is input to the autoencoder, the evaluation index affects accuracy of restoration of the original image. For example, a mean-square value of an error of a decoded image with respect to the original image may be used as the evaluation index (see NPL 1). In this case, a problem arises in that a high-frequency component of the decoded image is lost to result in deterioration of a subjective quality of the decoded image.

As a method for solving this problem, a method using adversarial training is proposed (see NPL 2). In the method using the adversarial training, a determination unit outputs a probability that the decoded image output from the autoencoder matches the original image input to the auto encode. The autoencoder learns so as to increase the probability that the decoded image matches the original image. In other words, the autoencoder learns such that a spatial distribution of the decoded image becomes closer to a spatial distribution of the original image. Consequently, in the method using the adversarial training, the high-frequency component of the decoded image is less likely to be lost.

CITATION LIST

Non-Patent Literatures

[NPL 1] J. Balle et al., "END-TO-END OPTIMIZED IMAGE COMPRESSION," arXiv, 3 Mar. 2017.

[NPL 2] O. Rippel et al., "Real-Time Adaptive Image Compression," arXiv, 16 May 2017

SUMMARY OF THE INVENTION

Technical Problem

In the method using the adversarial training, the high-frequency component of the decoded image is less likely to be lost, but a problem arises in that the subjective quality of the decoded image deteriorates. Specifically, when the original image is encoded using machine learning, an object structure in the original image input to the autoencoder may be different from an object structure in the decoded image output from the autoencoder. For example, eye positions in a facial image in the original image may be different from eye positions in a facial image in the decoded image. In this case, the subjective image quality of the decoded image deteriorates. Thus, there has conventionally been a problem in which, when the original image is encoded using machine learning, the subjective image quality of the decoded image deteriorates.

In view of the circumstances described above, an object of the present invention is to provide an encoding device, an encoding method, and a program which can suppress, when an original image is encoded using machine learning, the deterioration of a subjective image quality of a decoded image.

Means for Solving the Problem

An aspect of the present invention is an encoding device including: an association processing unit that associates first encoded data which is encoded data of an original image with second encoded data which is encoded data of a decoded image which is a result of decoding of the encoded data of the original image; and an encoding unit that encodes, based on a result of the association of the first encoded data with the second encoded data, a target image which is an image to be encoded.

An aspect of the present invention is the encoding device described above, wherein the association processing unit optimizes both of first encoding processing which is processing by which the original image is encoded to the first encoded data and processing by which the first encoded data obtained in the first encoding processing is decoded to the decoded image, and the second encoded data is data obtained by performing the first encoding processing also on the decoded image.

An aspect of the present invention is the encoding device described above, wherein the association processing unit optimizes both of the first encoding processing and the processing by which the first encoded data is decoded so as to reduce a difference between the first encoded data and the second encoded data.

An aspect of the present invention is the encoding device described above, including: a first encoding unit that performs first encoding processing which is processing by which the original image is encoded to the first encoded data; and a second encoding unit that performs second encoding processing which is processing by which the original image is encoded to third encoded data which is the encoded data of the original image, wherein the second encoding processing is optimized in advance, the second encoded data is data obtained by performing the second encoding processing optimized in advance also on the decoded image, and the association processing unit optimizes both of the first encoding processing and the processing by which the first encoded data is decoded to the decoded image so as to reduce a difference between the third encoded data and the second encoded data.

An aspect of the present invention is the encoding device described above, wherein the second encoded data is data obtained by performing the second encoding processing optimized in advance on a feature value extracted from the decoded image.

An aspect of the present invention is the encoding device described above, wherein a compression ratio for data of the original image in the second encoding processing is lower than a compression ratio for the data of the original image in the first encoding processing.

An aspect of the present invention is the encoding device described above, wherein the association processing unit increases, for the feature value extracted from the original image, a weighting factor for the feature value which increases an accuracy of restoration of the original image.

An aspect of the present invention is an encoding method to be implemented by an encoding device, the encoding method including the steps of: associating first encoded data which is encoded data of an original image with second encoded data which is encoded data of a decoded image which is a result of decoding of the encoded data of the original image; and encoding, based on a result of the association of the first encoded data with the second encoded data, a target image which is an image to be encoded.

An aspect of the present invention is a program for causing a computer to function as the encoding device described above.

Effects of the Invention

According to the present invention, when an original image is encoded using machine learning, it is possible to suppress the deterioration of a subjective image quality of a decoded image.

DESCRIPTION OF EMBODIMENTS

Referring to the drawings, a detailed description will be given of embodiments of the present invention.

In the following, an original image refers to an unencoded image. For example, the original image is an image of a predetermined photographic size, "x" represents a variable of the image in a horizontal direction, "y" represents a variable of the image in a vertical direction, and "z" represents a variable (color information) of the image in a channel direction. A dimension number (size) of the "x" with respect to the horizontal direction of the original image has a predetermined integer value "X". A dimension number of the "y" with respect to the vertical direction of the original image has a predetermined integer value "Y". A dimension number of the "z" with respect to the channel direction of the original image has a predetermined integer value "Z". When the original image is a gray image (monochrome image), the dimension number "Z" of the "z" with respect to the original image is 1. When the original image is an RGB (Red/Green/Blue) image, the dimension number "Z" of the "z" with respect to the original image is 3.

First Embodiment

Figure 1:
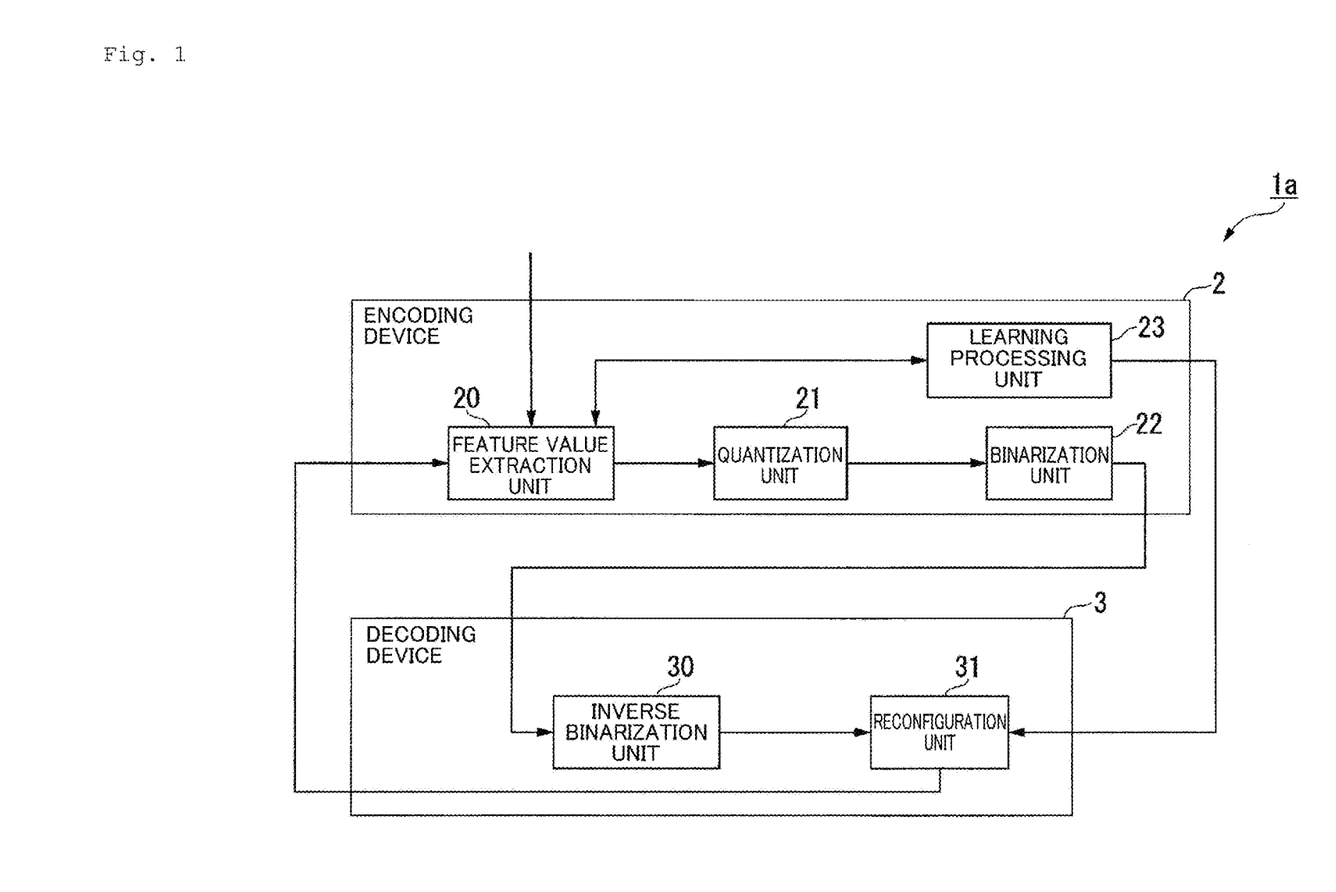
FIG. 1 is a diagram illustrating an example of a configuration of an encoding system in a first embodiment.

FIG. 1 is a diagram illustrating an example of a configuration of an encoding system 1a. The encoding system 1a is a system that encodes data by using machine learning. The encoding system 1a encodes data by using a neural network such as, e.g., an autoencoder. By way of example below, the encoding system encodes an image.

Stages of processing to be performed by the encoding system 1a include the stage at which training by the neural network is performed and the stage at which an image to be encoded (hereinafter referred to as "target image") is encoded.

At the stage at which the training is performed, a data set using the original image as sample data is stored in advance in, e.g., a nonvolatile recording medium. The encoding system 1a inputs, as a training image, the original image extracted from the sample data to the neural network to perform training processing on the neural network.

At the stage at which the target image is encoded, the encoding system 1a inputs the target image to the trained neural network to encode the target image. Note that the encoding system 1a may also perform the training processing again on the neural network after encoding the target image.

The encoding system 1a includes an encoding device 2 and a decoding device 3. Part or all of functions of the encoding device 2 and the decoding device 3 are implemented as software through execution of a program stored in a memory serving as a nonvolatile recording medium (non-transitory recording medium) by a processor such as a CPU (Central Processing Unit). The program may also be recorded on a computer readable recording medium. Examples of the computer readable recording medium include a portable medium such as a flexible disk, a magnetic optical disk, a ROM (Read Only Memory), or a CD-ROM (Compact Disk Read Only Memory) and a non-transitory storage medium such as a storage device embedded in a computer system, such as a hard disk. The program may also be transmitted via an electric communication network. Part or all of the functions of the encoding device 2 and the decoding device 3 may also be implemented using hardware including an electronic circuit or electronic circuitry using, e.g., an LSI (Large Scale Integration Circuit), an ASIC (Application Specific Integrated Circuit), PLD (Programmable Logic Device), a FPGA (Field Programmable Gate Array), or the like.

Next, an example of a configuration of the encoding device 2 will be described.

The encoding device 2 is an image processing device that encodes an image. At the stage at which the training is performed, the encoding device 2 inputs, as the training image, the original image extracted from the sample data to the neural network to perform the training processing of the neural network.

At the stage at which the training is performed, the encoding device 2 acquires, as the training image, an original image "I (x, y, z)" extracted from the data set. At the stage at which the target image is encoded, the encoding device 2 acquires the original image "I (x, y, z)" as the target image. The encoding device 2 generates a bit stream corresponding to the original image. The encoding device 2 outputs the bit stream to the decoding device 3.

The encoding device 2 includes, as functional units (encoding units) that performs encoding, a feature value extraction unit 20, a quantization unit 21, and a binarization unit 22. The encoding device 2 further includes a learning processing unit 23. The learning processing unit 23 may be provided in the decoding device 3 or may also be provided in an information processing device other than the encoding device 2 and the decoding device 3.

At the stage at which the training is performed, the feature value extraction unit 20 acquires, as the training image, the original image "I (x, y, z)" extracted from the data set. A bit precision of a pixel value of the original image is "B" bits, which is, e.g., 8 bits. The feature value extraction unit 20 extracts a feature value of the image from the original image. The feature value extracted from the original image will be hereinafter referred to as a "first feature value".

The feature value extraction unit 20 may also add random noise to the "first feature value" herein. The random noise is added for the purpose of preventing, even when each of encode features is 0, the training from being stopped. By adding the random noise, it is possible to perform control so as not to stop the training. Noise to be added can be set as appropriate. For example, noise in accordance with a Gaussian distribution having an average value "0" and a variance value "1" may be added or a random value selected from within a predetermined range (e.g., a range from −1 to +1) may also be added. The feature value extraction unit 20 outputs a first feature value "$F_n(x, y, z)$" to the quantization unit 21 and to the learning processing unit 23.

The feature value extraction unit 20 acquires, from the decoding device 3, a decoded image which is an image obtained by decoding the original image based on the bit stream corresponding to the original image. A feature value extracted from the decoded image will be hereinafter referred to as a "second feature value". The feature value extraction unit 20 extracts a second feature value "$F'_n(x, y, z)$" from the decoded image. The feature value extraction unit 20 outputs the second feature value "$F'_n(x, y, z)$" to the learning processing unit 23.

The quantization unit 21 performs quantization processing on the first feature value. The quantization unit 21 transforms the quantized first feature value to encoded data. The quantization unit 21 outputs the encoded data to the binarization unit 22.

The binarization unit 22 performs binarization processing on the generated encoded data. The binarization unit 22 generates a bit stream based on the binarized encoded data.

The learning processing unit 23 (association processing unit) acquires the first feature value and the second feature value from the feature value extraction unit 20. The learning processing unit 23 performs training processing (association processing) on each of neural networks of the encoding device 2 and the decoding device 3 based on the first feature value and the second feature value.

The learning processing unit 23 derives a loss function value based on an evaluation index using the encoded first and second feature values. The learning processing unit 23 updates parameters of each of the neural networks of the encoding device 2 and the decoding device 3 based on the loss function value (encode feature loss). For example, the learning processing unit 23 uses backpropagation to update the parameters.

At the stage at which the encoding device 2 encodes the target image, the encoding device 2 inputs the target image to the trained neural network (feature value extraction unit 20) in the encoding device 2 to encode the target image. Note that the encoding device 2 may also perform the training processing again on the neural network (feature value extraction unit 20) after encoding the target image.

Next, an example of a configuration of the decoding device 3 will be described.

The decoding device 3 is an image processing device that decodes image data. At the stage at which the training is performed, the decoding device 3 acquires, from the encoding device 2, the bit stream corresponding to the original image. The decoding device 3 generates, based on the bit stream, the decoded image (restored image of the original image) corresponding to the original image in the encoding device 2.

The decoding device 3 includes an inverse binarization unit 30 and a reconfiguration unit 31. The inverse binarization unit 30 performs inverse binarization processing on the bit stream output from the encoding device 2. The inverse binarization unit 30 converts the inversely binarized bit stream to encoded data of the image. The inverse binarization unit 30 outputs the encoded data of the image to the reconfiguration unit 31.

The reconfiguration unit 31 performs reconfiguration processing on the transformed encoded data to generate a decoded image "I'(x, y, z)". The reconfiguration unit 31 outputs the generated decoded image to the feature value extraction unit 20.

At the stage at which the encoding device 2 encodes the target image, the decoding device 3 inputs the encoded data to the trained neural network (reconfiguration unit 31) in the decoding device 3 to generate the decoded image corresponding to the target image (restored image of the target image). Note that the decoding device 3 may also perform the training processing again on the trained neural network (reconfiguration unit 31) in the decoding device 3 after the encoding device 2 encoded the target image.

Figure 2:
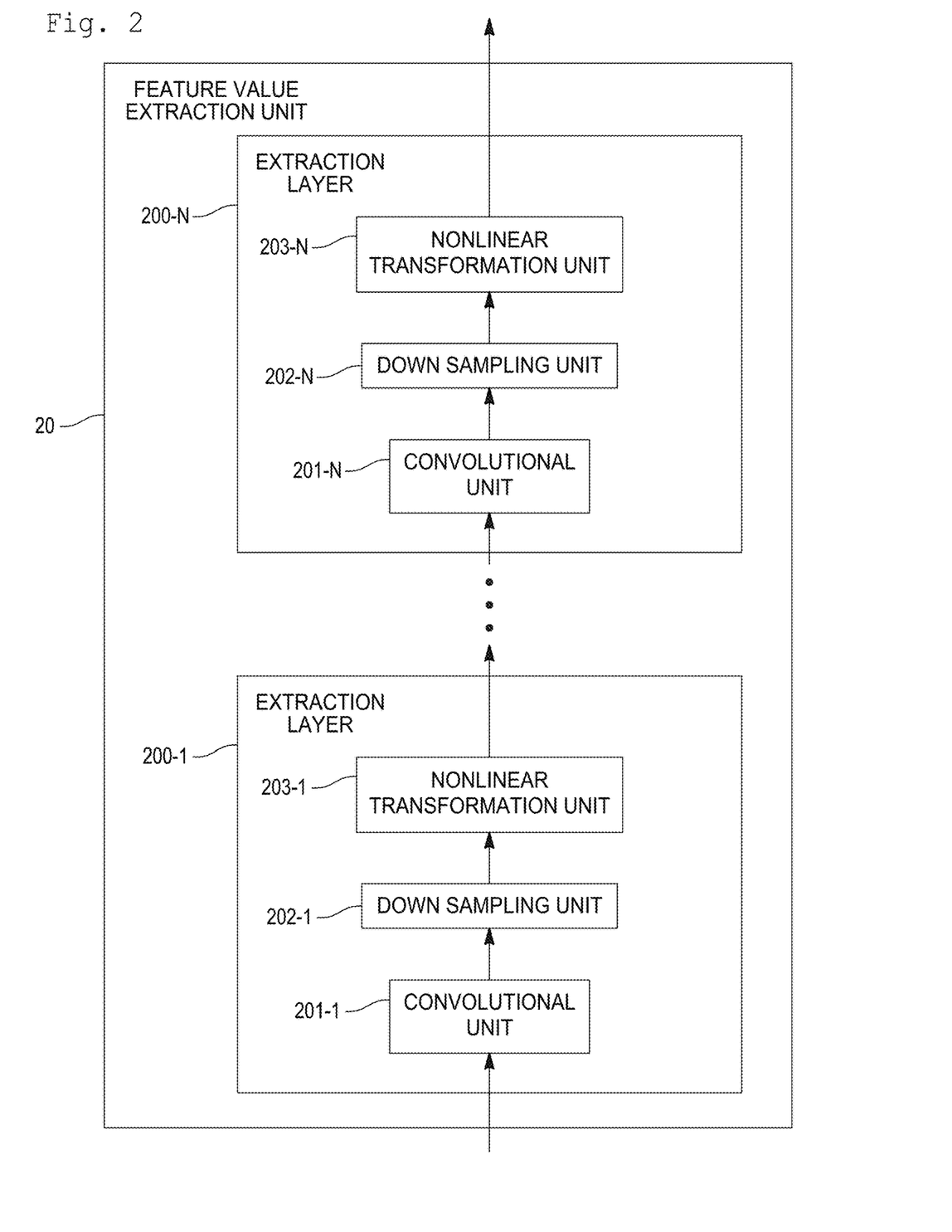
FIG. 2 is a diagram illustrating an example of a configuration of a feature value extraction unit in the first embodiment.

Next, an example of a configuration of the feature value extraction unit 20 of the encoding device 2 will be described in detail.

FIG. 2 is a diagram illustrating the example of the configuration of the feature value extraction unit 20. The feature value extraction unit 20 includes N ("N" is an integer equal to or greater than 1) extraction layers 200. In FIG. 2, an extraction layer 200-1 is the extraction layer at a frontmost stage (on an input side) in the neural network of the feature value extraction unit 20. An extraction layer 200-N is the extraction layer at a rearmost stage (on an output side) in the neural network of the feature value extraction unit 20.

An extraction layer 200-$n$ ($n=1, 2, \ldots,$ or N) extracts the first feature value "$F_n(x, y, z)$" from the original image "I(x, y, z)". The dimension number (size) of the "x" in the encoded data (compressed original image) generated based on the feature value extracted from the original image has a predetermined integer value "X'". The dimension number of the "y" in the encoded data has a predetermined integer value "Y'". The dimension number of the "z" in the encoded data has a predetermined integer value "Z'".

Each of the extraction layers 200 includes a convolutional unit 201, a down sampling unit 202, and a nonlinear transformation unit 203. The convolutional unit 201 performs a convolution operation on the original image "I(x, y, z)". The down sampling unit 202 performs down sampling processing on the original image after subjected to the convolution operation. The nonlinear transformation unit 203 performs nonlinear transformation processing on each of pixels of the original image after subjected to the down sampling processing.

The quantization unit 21 illustrated in FIG. 1 acquires, from the convolutional unit 201, the original image after subjected to the nonlinear transformation processing. The quantization unit 21 performs the quantization processing on the acquired original image such that the feature value (each of pixel values) of the acquired original image has a predetermined bit precision "B'".

The binarization unit 22 illustrated in FIG. 1 generates the encoded data based on the quantized feature value. The binarization unit 22 performs the binarization processing on the generated encoded data. The binarization unit 22 generates the bit stream based on the binarized encoded data. The binarization unit 22 outputs the bit stream to the decoding device 3. The bit stream may also include a header defined in a predetermined communication standard.

Note that the binarization unit 22 may also further perform entropy encoding on the bit stream. This allows the binarization unit 22 to compress a data size of the bit stream.

Figure 3:
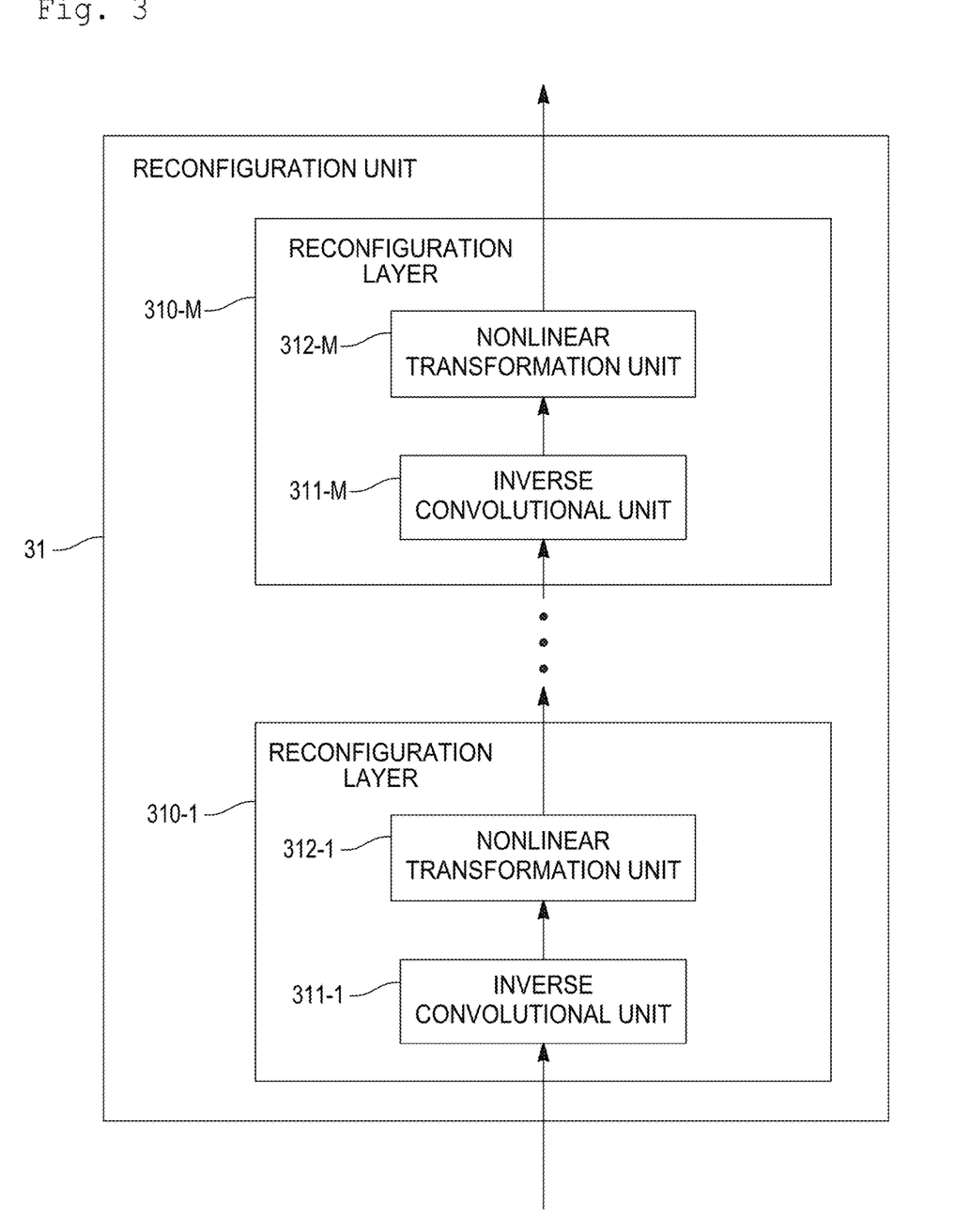
FIG. 3 is a diagram illustrating an example of a configuration of a reconfiguration unit in the first embodiment.

Next, an example of a configuration of the reconfiguration unit 31 of the decoding device 3 will be described in detail.

FIG. 3 is a diagram illustrating the example of the configuration of the reconfiguration unit 31. The reconfiguration unit 31 includes M (M is an integer of not less than 1) reconfiguration layers 310. In FIG. 3, a reconfiguration layer 310-1 is the reconfiguration layer at a frontmost stage (on an input side) in the neural network of the reconfiguration unit 31. A reconfiguration layer 310-M is the reconfiguration layer at a rearmost stage (on an output side) in the neural network of the reconfiguration unit 31.

Each of the reconfiguration layers 310 includes an inverse convolutional unit 311 and a nonlinear transformation unit 312. The inverse convolutional unit 311 acquires, from the inverse binarization unit 30, the encoded data resulting from the transformation from the bit stream. The inverse convolutional unit 311 performs an inverse convolution operation on the encoded data. The nonlinear transformation unit 312 performs nonlinear transformation processing on the encoded data after subjected to the inverse convolution operation. A nonlinear transformation unit 312-M outputs the decoded image "I'(x, y, z)" which is a result of the nonlinear transformation processing to the feature value extraction unit 20.

Figure 4:
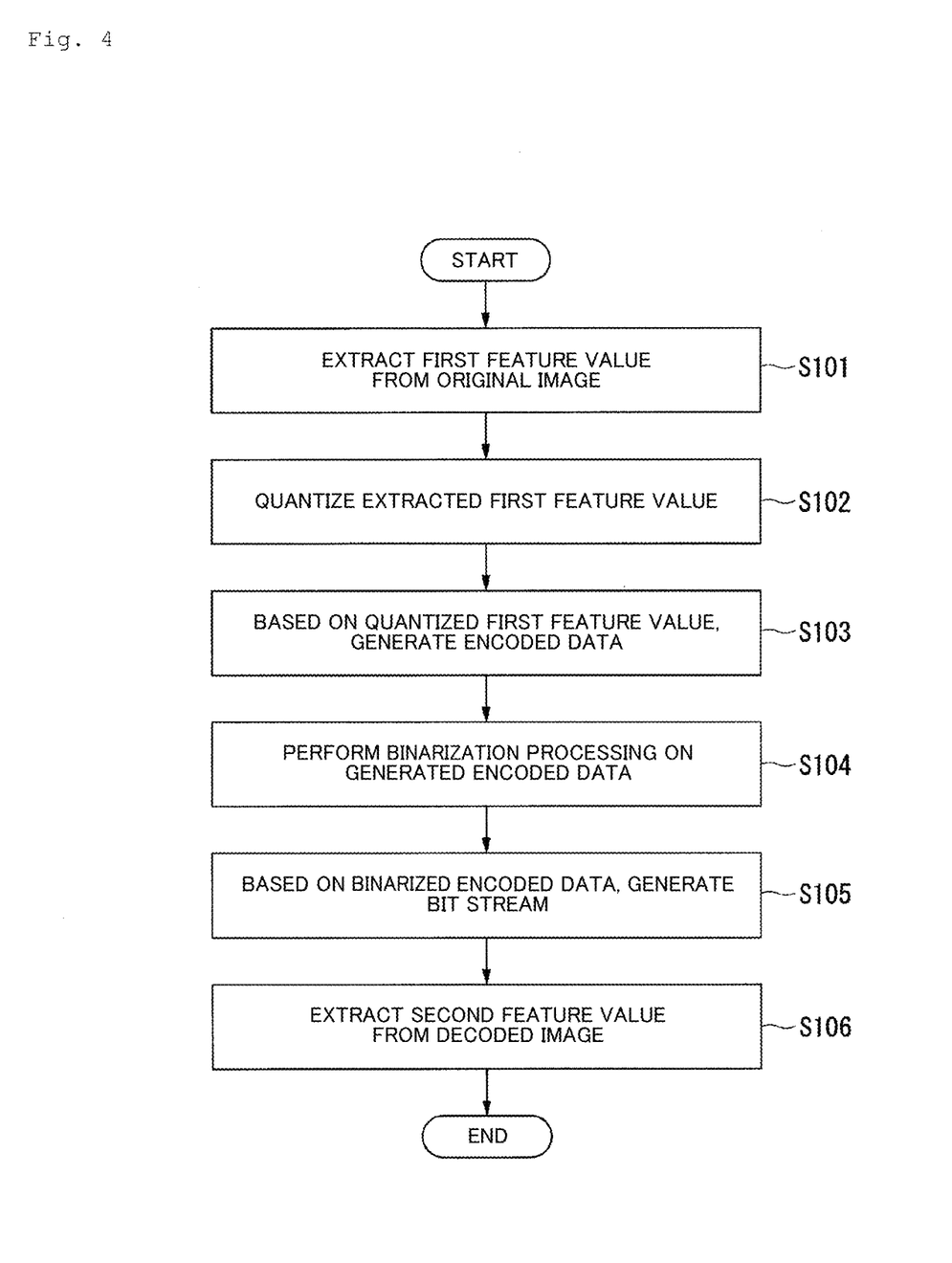
FIG. 4 is a flow chart illustrating an example of encoding processing by an encoding device in the first embodiment.

Next, an example of the encoding processing by the encoding device 2 will be described.

FIG. 4 is a flow chart illustrating the example of the encoding processing by the encoding device 2. At the stage at which the training is performed, the feature value extraction unit 20 extracts the first feature value from the original image (Step S101). The quantization unit 21 quantizes the extracted first feature value (Step S102). The binarization unit 22 generates the encoded data based on the quantized first feature value (Step S103).

The binarization unit 22 performs the binarization processing on the generated encoded data (Step S104). The binarization unit 22 generates the bit stream based on the binarized encoded data (Step S105). The feature value extraction unit 20 extracts the second feature value from the decoded image (Step S106).

Note that, at the stage at which the encoding device 2 encodes the target image, the encoding device 2 extracts the feature value of the image from the target image to thereby perform the encoding processing ON the target image.

Figure 5:
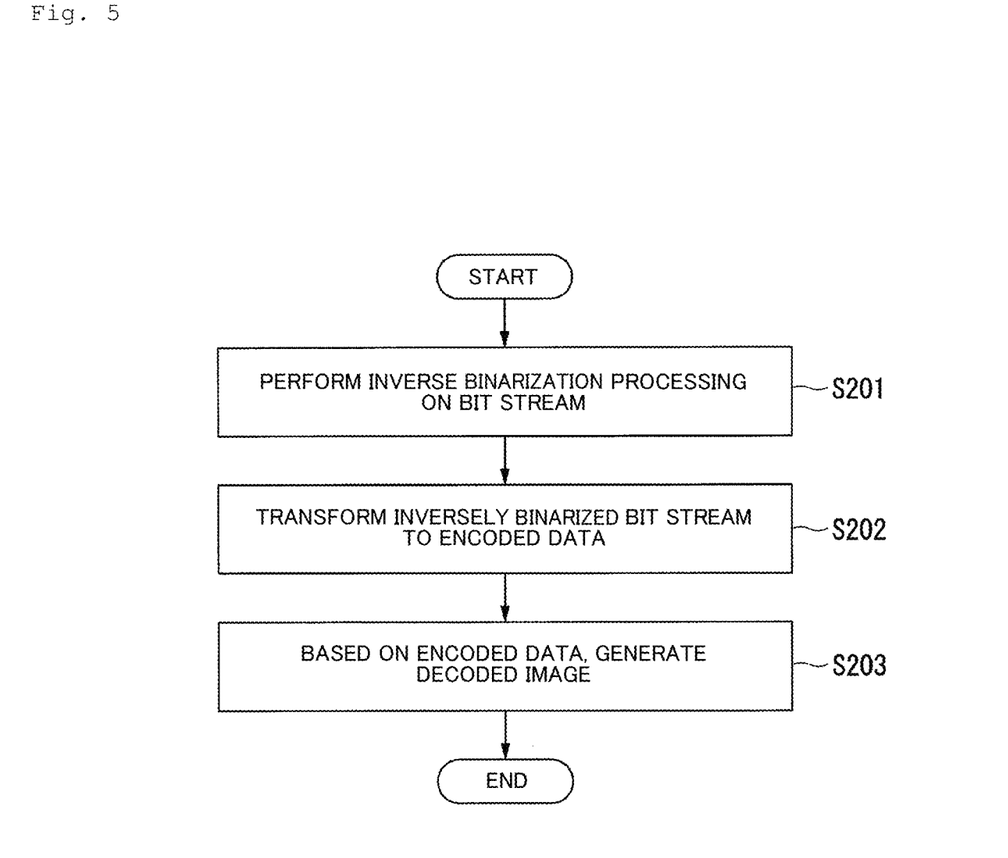
FIG. 5 is a flow chart illustrating an example of decoding processing by a decoding device in the first embodiment.

Next, an example of the decoding processing by the decoding device 3 will be described.

FIG. 5 is a flow chart illustrating an example of the decoding processing by the decoding device 3. At the stage at which the training is performed, the inverse binarization unit 30 performs the inverse binarization processing on the bit stream output from the encoding device 2 (Step S201). The inverse binarization unit 30 transforms the inversely binarized bit stream to the encoded data of the original image (Step S202). The reconfiguration unit 31 generates the decoded image based on the encoded data resulting from the transformation (Step S203).

Note that, at the stage at which the encoding device 2 encodes the target image, the decoding device 3 generates the decoded image based on the encoded data corresponding to the target image.

Figure 6:
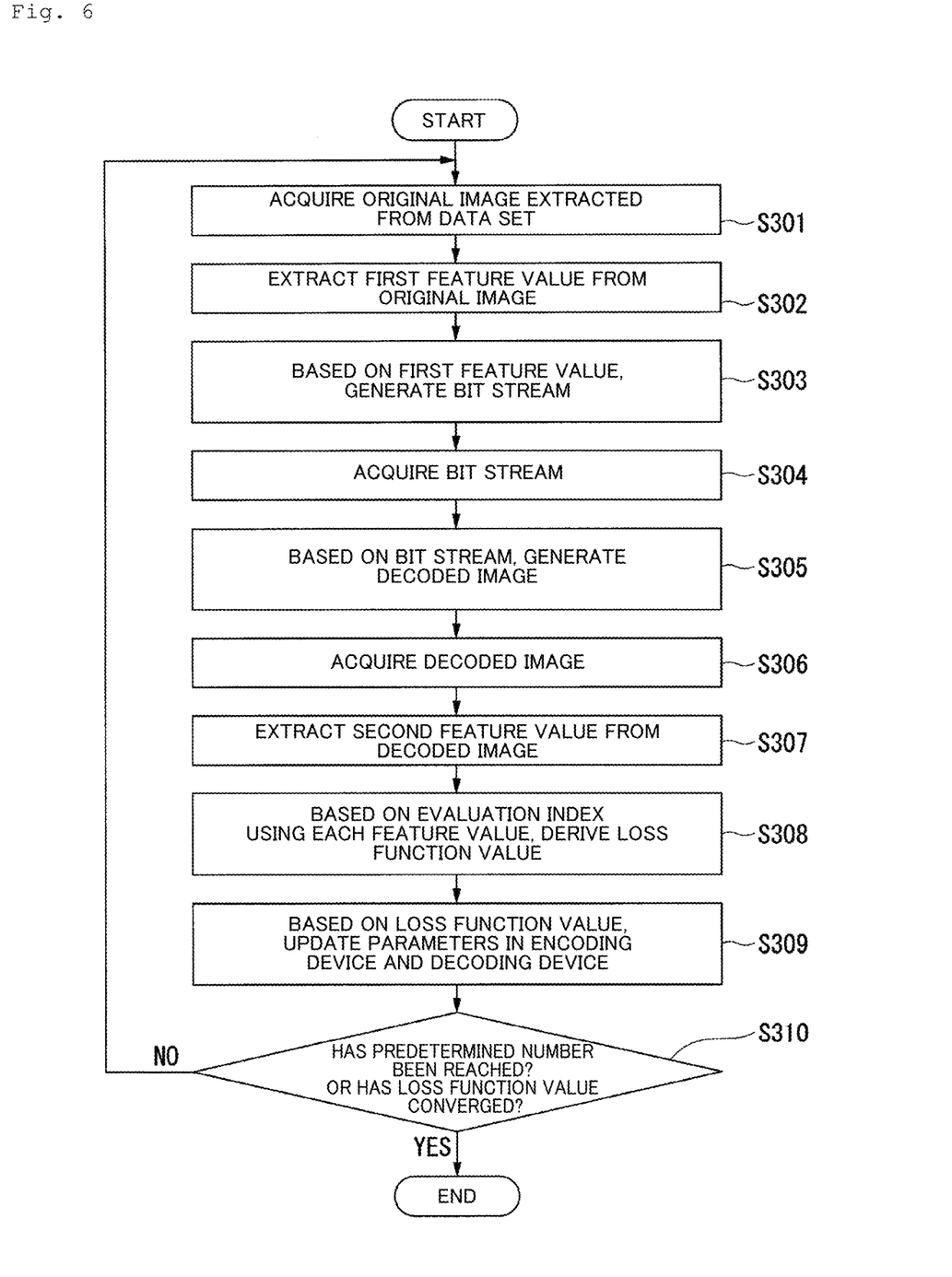
FIG. 6 is a flow chart illustrating an example of training processing by the encoding system in the first embodiment.

Next, an example of machine learning processing will be described.

FIG. 6 is a flow chart illustrating an example of the training processing by the encoding system 1a. At the stage at which the training is performed, the feature value extraction unit 20 acquires the original image "I(x, y, z)" extracted from the data set (Step S301). The feature value extraction unit 20 extracts the first feature value "$F_n(x, y, z)$" from the original image (Step S302). The feature value extraction unit 20 may also add the random noise to the "first feature value" herein. The quantization unit 21 quantizes the extracted first feature value. The quantization unit 21 generates the encoded data based on the quantized first feature value. The binarization unit 22 performs the binarization processing on the generated encoded data. The binarization unit 22 generates the bit stream based on the binarized encoded data (Step S303).

The inverse binarization unit 30 acquires the bit stream from the encoding device 2 (Step S304). The inverse binarization unit 30 performs the inverse binarization processing on the acquired bit stream. The inverse binarization unit 30 transforms the inversely binarized bit stream to the encoded data of the image. The reconfiguration unit 31 generates the decoded image based on the encoded data resulting from the transformation (Step S305).

The feature value extraction unit 20 acquires the decoded image from the decoding device 3 (Step S306). The feature value extraction unit 20 extracts the second feature value "$F'_n(x, y, z)$" from the decoded image (Step S307).

The learning processing unit 23 derives, based on an evaluation index "diff" using the first feature value and the second feature value, a loss function value "loss" as shown in, e.g., Expression (1).

[Math. 1]

$$\text{loss} = \sum_n \sum_x \sum_y \sum_z w_n(x, y, z) * \text{diff}(F_n(x, y, z), F'_n(x, y, z)) \quad (1)$$

Here, $w_n(x, y, z)$ represents a weighting factor. The evaluation index "diff(a, b)" is a value of a function for deriving a distance (e.g., square error) between "a" and "b" (Step S308).

The learning processing unit 23 updates, based on the derived loss function value "loss", parameters of each of the neural networks of the feature value extraction unit 20 and the reconfiguration unit 31 (autoencoder). For example, the learning processing unit 23 uses the backpropagation to update the parameters (Step S309).

The weighting factor $w_n(x, y, z)$ shown in Expression (1) is represented as in Expression (2).

[Math. 2]

$$w_n(x, y, z) = \frac{c_n(x, y, z)}{\sum_i \sum_j \sum_k \text{diff}(I(i, j, k) - \text{dec}(Q(f(F_n(x, y, z)))))} \quad (2)$$

Here, $c_n(x, y, z)$ represents a factor for normalization, "f" represents processing of setting, to "0", values other than the elements "n", "x", "y", and "z" of the first feature value "$F_n(x, y, z)$", "Q" represents the quantization processing, and "dec" represents the decoding processing.

The learning processing unit 23 increases, using, e.g., the backpropagation, the weighting factor "$w_n(x, y, z)$" for the feature value of each of the elements "n", "x", "y", and "z" of the first feature value "$F_n(x, y, z)$" that increases an accuracy of restoration of the original image (training image) when the decoded image is generated using only each of the elements of the first feature value.

The learning processing unit 23 determines whether or not the number of times the operation in S310 illustrated in FIG. 6 is performed is not less than a predetermined number and whether or not the loss function value "loss" has converged (Step S310). When the number of times the operation in S310 is performed is less than the predetermined number and the loss function value has not converged (NO in Step S310), the learning processing unit 23 returns the processing to Step S301. When the number of times the operation in S310 is performed is not less than the predetermined number or the loss function value has converged (NO in Step S310), the learning processing unit 23 finishes performing the processing illustrated in FIG. 6.

Figure 7:
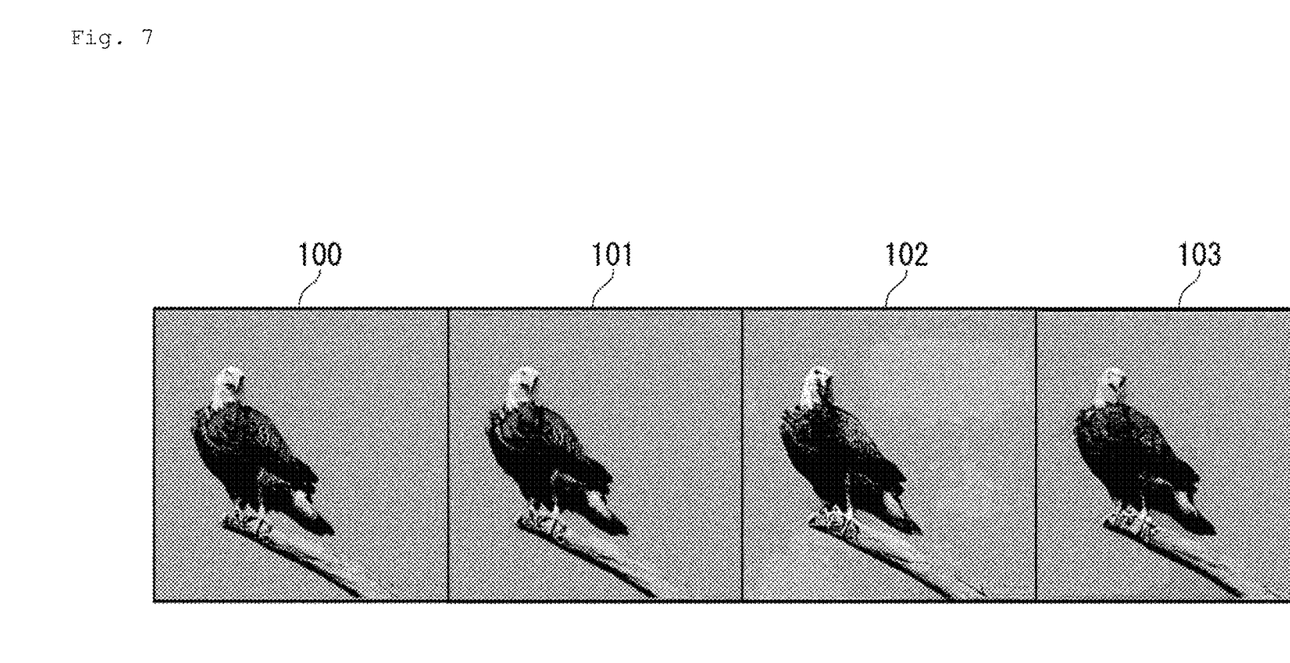
FIG. 7 is a diagram illustrating an example of individual images in the first embodiment.

Next, an example of a result of the image processing in the encoding system 1a will be described.

FIG. 7 is a diagram illustrating an example of individual images. A target image 100 is the original image of the target image. A decoded image 101 is an image obtained by decoding the target image 100 encoded based on HEVC (High Efficiency Video Coding). A decoded image 102 is an image obtained by decoding the target image 100 encoded based on NPL 2. A decoded image 103 is an image obtained through decoding of the target image 100 encoded by the encoding device 2 by the decoding device 3. In the decoded image 103, a high-frequency component is more reliably prevented from being lost than in the decoded image 101. In the decoded image 103, accuracy of restoration of a color difference component (color information) of the target image 100 is improved compared to that in the decoded image 102.

Thus, the encoding system 1a in the first embodiment includes the encoding unit including the feature value extraction unit 20 and the quantization unit 21, and the learning processing unit 23 (association processing unit).

The learning processing unit 23 associates first encoded data which is the encoded data of the original image with second encoded data which is the encoded data of the decoded image which is a result of the decoding of the encoded data of the original image. The encoding unit encodes the target image based on a result of the association (training result) of the first encoded data with the second encoded data.

As a result, when the original image is encoded using machine learning, it is possible to suppress the deterioration of a subjective image quality of the decoded image.

The encoding system 1a optimizes the parameters of the neural network so as to minimize an error between the first feature value obtained by inputting the original image to the encoding device 2 and the second feature value obtained by inputting the decoded image corresponding to the original image to the encoding device 2. Since the encoding system 1a does not perform minimization of the error for each of space regions as performed in the method disclosed in NPL 1, it is possible to suppress the deterioration of a resolution of the decoded image.

The loss function value shown by way of example in Expression (1) increases as the object structure in the original image in the autoencoder is more different from the object structure in the decoded image output from the autoencoder. The encoding system 1a encodes, based on the loss function value, the original image so as to retain the object structure in the original image. This allows the encoding system 1a to suppress the deterioration of the subjective image quality of the decoded image.

The learning processing unit 23 may also optimize both of first encoding processing which is processing by which the original image is encoded to the first encoded data and processing by which the first encoded data in the first encoding processing is decoded to the decoded image. The second encoded data may also be data obtained by performing the first encoding processing also on the decoded image. The learning processing unit 23 may also optimize both of the first encoding processing and the processing by which the first encoded data is decoded so as to reduce a difference between the first encoded data and the second encoded data. The learning processing unit 23 may also increase, for the feature value extracted from the original image, the weighting factor for the feature value that increases the accuracy of the restoration of the original image.

First Modification

The learning processing unit 23 may derive the loss function value "loss" based on a portion of the evaluation index "diff" shown by way of example in Expression (1). The learning processing unit 23 may also add a new term to the evaluation index "diff" shown by way of example in Expression (1). The learning processing unit 23 may also derive the loss function value "loss" based on the evaluation index to which the new term is added.

Second Modification

The encoding device 2 may generate the bit stream based on the second feature value "$F'_n(x, y, z)$" extracted from the first decoded image. The decoding device 3 may generate a second decoded image based on the bit stream generated based on the second feature value. The feature value extraction unit 20 may also extract a third feature value "$F''_n(x, y, z)$" from the second decoded image.

The learning processing unit 23 may also use the third feature value "$F''_n(x, y, z)$" in Expression 1 instead of the second feature value "$F'_n(x, y, z)$" shown in Expression 1. The learning processing unit 23 may also add a new term to Expression (1). For example, the learning processing unit 23 may also use the first feature value, the second feature value, and the third feature value in Expression (1).

Third Modification

The learning processing unit 23 may also give a weighting factor to an intermediate feature value during the encoding processing performed on the image by the encoding device 2. The learning processing unit 23 may also give the weighting factor to the intermediate feature value depending on the number of elements in each of layers of the neural network. The learning processing unit 23 may also give the weighting factor to an encoded feature value depending on a degree of importance of the feature value in the image. For example, the learning processing unit 23 may also give weighting factors which are progressively larger in order of PSNR (Peak signal-to-noise ratio) to the encoded feature values.

Fourth Modification

The encoding device 2 and the decoding device 3 may also repeat a combination of the encoding processing and the decoding processing a plurality of times. Considering that information is lost in the decoded image, the encoding device 2 may also encode the decoded image again.

Second Embodiment

Figure 8:
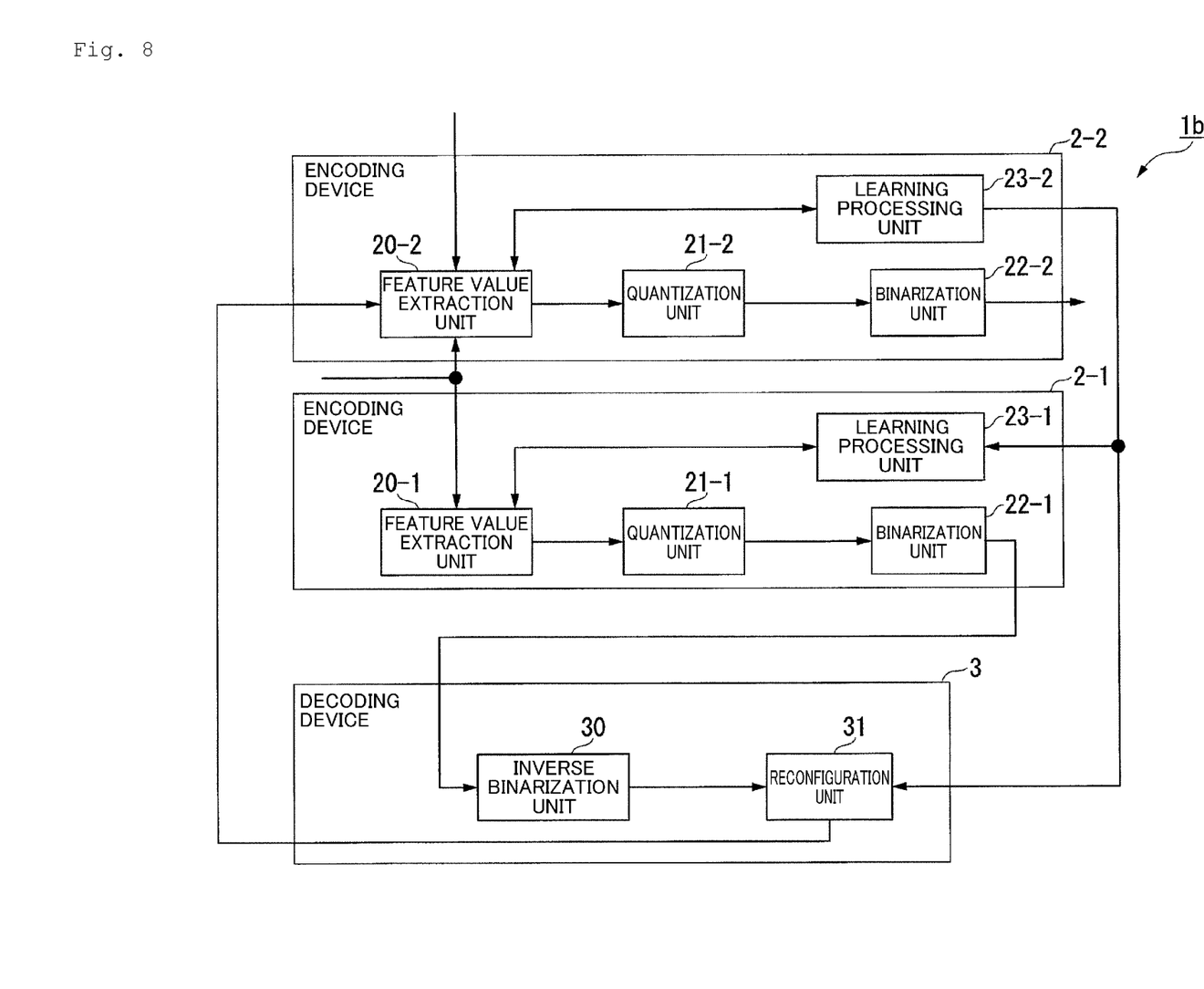
FIG. 8 is a diagram illustrating an example of a configuration of an encoding system in a second embodiment.

The second embodiment is different from the first embodiment in that the feature value extraction unit 20 having the trained neural network extracts a feature value from an image. In the second embodiment, a difference from the first embodiment will be described.

FIG. 8 is a diagram illustrating an example of a configuration of an encoding system 1b. The encoding system 1b is a system that encodes data by using machine learning. The encoding system 1b uses a neural network such as, e.g., an autoencoder to encode the data. The encoding system 1b includes an encoding device 2-1 (first encoding device), an encoding device 2-2 (second encoding device), and the decoding device 3.

The encoding device 2-1 is an image processing device that encodes images using a neural network in training. At the stage at which training is performed, the encoding device 2-1 acquires, as the training image, the original image "$I(x, y, z)$" extracted from a data set. The encoding device 2-1 generates a bit stream corresponding to the original image. The encoding device 2-1 outputs the bit stream to the decoding device 3.

The decoding device 3 acquires, from the encoding device 2-1, the bit stream corresponding to the original image in the encoding device 2-1. The decoding device 3 generates, based on the bit stream, a decoded image corresponding to the original image in the encoding device 2-1. The decoding device 3 outputs the decoded image to the encoding device 2-2.

The encoding device 2-2 is an image processing device that uses the neural network trained by, e.g., the training processing described in the first embodiment or the like to encode the image. The encoding device 2-2 acquires the same original image as the original image "$I(x, y, z)$" input to the encoding device 2-1. The encoding device 2-2 extracts the first feature value "$F_n(x, y, z)$" from the original image. The encoding device 2-2 acquires the decoded image from the decoding device 3. The encoding device 2-2 extracts the second feature value "$F'_n(x, y, z)$" from the decoded image.

The encoding device 2-2 derives a loss function value based on an evaluation index using a first feature value and a second feature value. The encoding device 2-2 updates, based on a loss function value, parameters of each of respective neural networks of the encoding device 2-1 and the decoding device 3. For example, the encoding device 2-2 uses backpropagation to update the parameters.

Next, a description will be given of an example of configurations of the encoding devices 2-1 and 2-2.

The encoding device 2-1 includes a feature value extraction unit 20-1, a quantization unit 21-1, and a binarization unit 22-1. The encoding device 2-1 may also include a learning processing unit 23-1. The encoding device 2-2 includes a feature value extraction unit 20-2, a quantization unit 21-2, a binarization unit 22-2, and a learning processing unit 23-2.

The feature value extraction unit 20-2 acquires the same original image as the original image "$I(x, y, z)$" input to the feature value extraction unit 20-1. The feature value extraction unit 20-2 extracts the first feature value "$F_n(x, y, z)$" from the original image. The feature value extraction unit 20-2 outputs the first feature value "$F_n(x, y, z)$" to the learning processing unit 23-2.

The feature value extraction unit 20-2 acquires the decoded image from the decoding device 3. The feature value extraction unit 20-2 extracts the second feature value "$F'_n(x, y, z)$" from the decoded image. The feature value extraction unit 20-2 outputs the second feature value to the learning processing unit 23-2.

The learning processing unit 23-2 derives, based on the evaluation index "diff" using the first feature value and the second feature value, the loss function value "loss" as shown in, e.g., Expression (1).

A compression ratio for the feature value of the original image in the encoding device 2-1 is represented as in Expression (3) based on ratios between the dimension numbers (X, Y, Z, B) of the original image and the dimension numbers (X', Y', Z', B') of the encoded data. Likewise, a compression ratio for the feature value of the original image in the encoding device 2-2 or the decoded image is represented as in Expression (3) based on ratios between the dimension numbers (X, Y, Z, B) of the original image or the decoded image and the dimension numbers (X', Y', Z', B') of the encoded data.

[Math. 3]

$$圧縮率 = 1 - \frac{X' * Y' * Z' * B'}{X * Y * Z * B} \quad (3)$$

Compression Ratio

Here, the encoding device 2-2 (trained autoencoder) performs encoding processing with low compression, while the encoding device 2-1 performs encoding processing with high compression higher than the low compression (autoencoder in training). In a result of the encoding processing by the encoding device 2-2, sufficient information remains. In the encoded data in the encoding processing with the low compression, a data size of "NUMBER OF ELEMENTS (NUMBER OF PIXELS)×BIT PRECISION" is large while, in the encoded data in the encoding processing with the high compression, the data size of "NUMBER OF ELEMENTS (NUMBER OF PIXELS)×BIT PRECISION" is small. In other words, the compression ratio for the feature value of the image in the processing by which the feature value extraction unit 20-2 extracts the first feature value from the original image is lower than the compression ratio for the feature value of the image in the processing by which the feature value extraction unit 20-1 extracts the first feature value from the original image. Therefore, in the encoding device 2-1, optimization of the neural network in training of the encoding device 2-1 is performed based on the first feature value and the second feature value each obtained from the trained neural network of the encoding device 2-2. Specifically, the learning processing unit 23-2 optimizes, based on an error between the first feature value and the second feature value each obtained from the feature value extraction unit 20-2, parameters of respective neural networks of the feature value extraction unit 20-1 and the reconfiguration unit 31-1. The parameters of the respective neural networks of the feature value extraction unit 20-1 and the reconfiguration unit 31-1 are optimized as the autoencoders so as to allow an output of the reconfiguration unit 31-1 to restore the input to the feature value extraction unit 20-1.

The learning processing unit 23-2 derives the loss function value based on the evaluation index using the first feature value and the second feature value. The learning processing unit 23-2 updates, based on the loss function value, the parameters of the respective neural networks of the feature value extraction unit 20-1 and the reconfiguration unit 31. For example, the learning processing unit 23-2 uses the backpropagation to update the parameters. Note that the learning processing unit 23-2 may also update the parameters of the neural network of the feature value extraction unit 20-1 via the learning processing unit 23-1.

Figure 9:
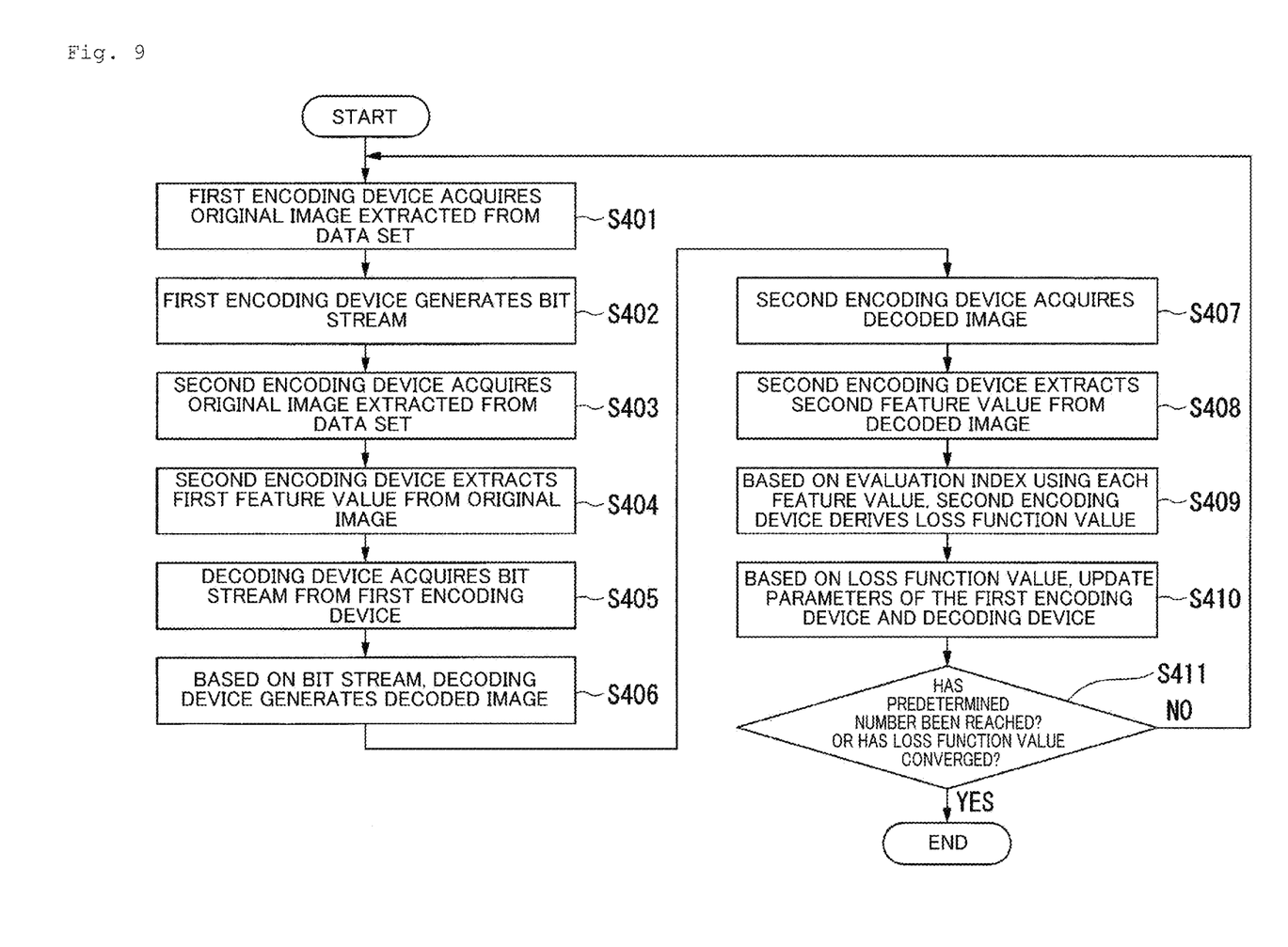
FIG. 9 is a flow chart illustrating an example of training processing by the encoding system in the second embodiment.

Next, an example of the training processing for the neural networks will be described.

FIG. 9 is a flow chart illustrating the example of the training processing by the encoding system 1b. At the stage at which the training is performed, the feature value extraction unit 20-1 acquires the original image "I(x, y, z)" extracted from the data set (Step S401).

The quantization unit 21-1 quantizes the extracted first feature value. The binarization unit 22-1 generates the encoded data based on the quantized first feature value. The binarization unit 22-1 performs the binarization processing on the generated encoded data. The binarization unit 22-1 generates the bit stream based on the binarized encoded data (Step S402).

The feature value extraction unit 20-2 acquires the same original image as the original image "I(x, y, z)" input to the feature value extraction unit 20-1 (Step S403). The feature value extraction unit 20-2 extracts, from the original image, the first feature value "$F_n(x, y, z)$" (Step S404).

The inverse binarization unit 30 acquires the bit stream from the binarization unit 22-1 (Step S405). The inverse binarization unit 30 performs the inverse binarization processing on the bit stream acquired from the binarization unit 22-1. The inverse binarization unit 30 transforms the inversely binarized bit stream to the encoded data of the image. The reconfiguration unit 31 generates the decoded image based on the encoded data resulting from the transformation (Step S406).

The feature value extraction unit 20-1 acquires the decoded image from the decoding device 3 (Step S407). The feature value extraction unit 20-1 extracts the second feature value "$F'_n(x, y, z)$" from the decoded image (Step S408).

The learning processing unit 23-2 derives the loss function value "loss" based on the evaluation index "diff" using the first feature value and the second feature value. The learning processing unit 23-1 may also derive the loss function value "loss" (Step S409).

The learning processing unit 23-2 updates, based on the loss function value, the parameters of the respective neural networks of the feature value extraction unit 20-1 and the reconfiguration unit 31-1. Note that, based on the loss function value derived by the learning processing unit 23-2, the learning processing unit 23-1 may also update the parameters of the respective neural networks of the feature value extraction unit 20-1 and the reconfiguration unit 31-1 (Step S410).

The learning processing unit 23-2 determines whether or not the number of times the operation in Step S411 illustrated in FIG. 9 is performed is not less than a predetermined number and whether or not the loss function value has converged (Step S411). When the number of times the operation in Step S411 is performed is less than the predetermined number and when the loss function value has not converged (NO in Step S411), the encoding system 1b returns the processing to Step S401. When the number of times the operation in Step S411 is performed is not less than the predetermined number or when the loss function value has converged (NO in Step S411), the encoding system 1b finishes performing the processing illustrated in FIG. 9.

As described above, the encoding system 1b in the second embodiment includes the encoding device 2-1 (first encoding unit) including the feature value extraction unit 20-1 (neural network in training) and the quantization unit 21-1, the encoding device 2-2 (second encoding unit) including the feature value extraction unit 20-2 (trained neural network) and the quantization unit 21-2, and the learning processing unit 23 (association processing unit). The second encoding processing which is the processing by which the encoding device 2-2 encodes the original image to third encoded data (encoded data of the third feature value) has been optimized in advance in the encoding device 2-2. The second encoded data (encoded data of the second feature value) is data obtained by performing the second encoding processing optimized in advance in the encoding device 2-2 also on the decoded image. The learning processing unit 23 optimizes both of the first encoding processing which is the processing by which the encoding device 2-1 encodes the original image to the first encoded data and the processing by which the first encoded is decoded to the decoded image so as to minimize a difference between the third encoded data which is the encoded data of the original image which is obtained in the second encoding processing optimized in advance in the encoding device 2-2 and the second encoded data.

As a result, when the original image is encoded using the machine learning, it is possible to suppress the deterioration of a subjective image quality of the decoded image.

In the first embodiment, the encoding device 2 having the neural network in training extracts the feature value from the image. Consequently, in the first embodiment, there is a possibility that a speed of the machine learning decreases and the machine learning does not progress. By contrast, in the second embodiment, the encoding device 2-2 having the trained neural network extracts the feature value from the image. As a result, in the second embodiment, the speed of the machine learning is less likely to decrease, and therefore it is possible to reduce the possibility that the machine learning does not progress.

The second encoded data (encoded data of the second feature value) is data obtained by performing the second encoding processing optimized in advance in the encoding device 2-2 on the second feature value extracted from the decoded image. The compression ratio for the data of the original image in the second encoding processing by the encoding device 2-2 is lower than the compression ratio for the data of the original image in the first encoding processing by the encoding device 2-1. Since the compression ratio in the encoding processing by the encoding device 2-2 is lower than the compression ratio in the encoding processing by the encoding device 2-1, in the encoding device 2-1, the optimization of the neural network in training of the encoding device 2-1 is performed based on the feature value obtained from the trained neural network of the encoding device 2-2.

While the detailed description has been given heretofore of the embodiments of this invention with reference to the drawings, specific configurations are not limited to those in the embodiments, and also include design and the like in a scope not departing from the gist of this invention.

INDUSTRIAL APPLICABILITY

The present invention is applicable to a device that encodes or decodes data.

REFERENCE SIGNS LIST 1a, 1b Encoding system
2 Encoding device
3 Decoding device
20 Feature value extraction unit
21 Quantization unit
22 Binarization unit
23 Learning processing unit
30 Inverse binarization unit
31 Reconfiguration unit
100 Target image
101 Decoded image
102 Decoded image
103 Decoded image
200 Extraction layer
201 Convolutional unit
202 Down sampling unit
203 Nonlinear transformation unit
310 Reconfiguration layer
311 Inverse convolutional unit
312 Nonlinear transformation unit

The invention claimed is:

1. An encoding device comprising:
a processor; and
a storage medium having computer program instructions stored thereon, when executed by the processor, causes the processor to:
associate first encoded data that is encoded data of an original image with second encoded data that is encoded data of a decoded image that is a result of decoding of the encoded data of the original image;
encode, based on the result of the association of the first encoded data with the second encoded data, a target image that is an image to be encoded;
perform first encoding processing that is processing by which the original image is encoded into the first encoded data; and
perform second encoding processing that is processing by which the original image is encoded into third encoded data that is the encoded data of the original image, wherein the second encoding processing is optimized in advance, the second encoded data is data obtained by performing, also on the decoded image, the second encoding processing optimized in advance, and wherein the computer program instructions further perform to optimize both of the first encoding processing and the processing by which the first encoded data is decoded into the decoded image so as to reduce a difference between the third encoded data and the second encoded data.

2. The encoding device according to claim 1, wherein the second encoded data is data obtained by performing the second encoding processing optimized in advance on a feature value extracted from the decoded image.

3. The encoding device according to claim 1, wherein a compression ratio for data of the original image in the second encoding processing is lower than the compression ratio for the data of the original image in the first encoding processing.

4. The encoding device according to claim 1, wherein the computer program instructions further perform to increase, for a feature value extracted from the original image, a weighting factor for the feature value that increases an accuracy of restoration of the original image.

5. An encoding method to be implemented by an encoding device, the encoding method comprising the steps of:
associating first encoded data that is encoded data of an original image with second encoded data that is encoded data of a decoded image that is a result of decoding of the encoded data of the original image;
encoding, based on the result of associating the first encoded data with the second encoded data, a target image that is an image to be encoded;
performing first encoding processing that is processing by which the original image is encoded into the first encoded data;
performing second encoding processing that is processing by which the original image is encoded into third encoded data that is the encoded data of the original image, wherein the second encoding processing is optimized in advance, the second encoded data is data obtained by performing, also on the decoded image, the second encoding processing optimized in advance; and
optimizing both of first encoding processing that is processing by which the original image is encoded into the first encoded data and processing by which the first encoded data in the first encoding processing is decoded into the decoded image so as to reduce a difference between the first encoded data and the second encoded data.

6. The encoding method of claim 5 wherein the second encoded data is data obtained by performing the second encoding processing optimized in advance on a feature value extracted from the decoded image.

7. The encoding method of claim 5 wherein a compression ratio for data of the original image in the second encoding processing is lower than the compression ratio for the data of the original image in the first encoding processing.

8. The encoding method of claim 5 further comprises increasing, for a feature value extracted from the original image, a weighting factor for the feature value that increases an accuracy of restoration of the original image.

\* \* \* \* \*